United States Patent [19]
Kobayashi

[11] Patent Number: 5,501,386
[45] Date of Patent: Mar. 26, 1996

[54] TAPE GUIDE ROLLER WITH FLANGE AND TAPERED SURFACE FOR USE IN VIDEO TAPE RECORDER

[75] Inventor: Hiroshi Kobayashi, Tokyo, Japan

[73] Assignee: Sony Corporation, Tokyo, Japan

[21] Appl. No.: 462,569

[22] Filed: Jun. 5, 1995

Related U.S. Application Data

[63] Continuation of Ser. No. 247,510, May 23, 1994, abandoned, which is a continuation of Ser. No. 29,921, Mar. 11, 1993, abandoned, which is a continuation of Ser. No. 802,307, Dec. 4, 1991, abandoned.

[30] Foreign Application Priority Data

Dec. 27, 1990 [JP] Japan ........................ 2-414951

[51] Int. Cl.$^6$ ........................................ G11B 15/60
[52] U.S. Cl. ........................... 226/190; 226/196
[58] Field of Search ........................ 226/190, 196; 242/76, 358, 615, 615.2, 615.4, 346

[56] References Cited

U.S. PATENT DOCUMENTS

| | | | |
|---|---|---|---|
| 3,143,270 | 8/1964 | Cohen | 226/196 |
| 3,270,936 | 9/1966 | Selsted et al. | 226/196 |
| 3,276,651 | 10/1966 | Bryer | 226/190 |
| 3,768,717 | 10/1973 | Salcedo | 226/198 |
| 4,017,897 | 4/1977 | Blanding | 242/346 |
| 4,114,751 | 9/1978 | Nordin | 226/196 |
| 4,336,900 | 6/1982 | Pontoni | 226/97 |
| 4,337,885 | 7/1982 | Stahler | 226/97 |
| 4,441,133 | 4/1984 | Ogawa et al. | 226/196 |
| 4,729,500 | 3/1988 | Gwon | 226/190 |
| 5,160,078 | 11/1992 | Spicer | 226/190 |

OTHER PUBLICATIONS

IBM Technical Disclosure vol. 10, No. 8, Guiding mechanism for thin tapes, Jan. 1968, Hertrich.
IBM Technical Disclosure Bulleting vol. 9, No. 12, Record belt aligning drive roller, May 1967, McNece.
IBM Technical Disclosure Bulletin, "Guiding Mechanism for Thin Tapes," Hertrich, vol. 10, No. 8, Jan. 1968, p. 1096.

*Primary Examiner*—John P. Darling
*Attorney, Agent, or Firm*—Jay H. Maioli

[57] ABSTRACT

In a tape transport portion of a tape recording and reproducing apparatus, the height of a tape is regulated without applying an excessive force to the tape. In a tape guide roller having a roller (9) which is brought in rotatable contact with a tape (2) and a flange (10) which regulates the height of the tape (2), the flange (10) has a tapered surface (15) opposing the inner surface of the tape (2) and a force for regulating the height of the tape (2) is generated by the cooperation of both a tape regulating end face (13) of the flange (10) and the tapered surface (15). Since the tape height regulating force is generated by two different parts, i.e., the tape regulating end face (13) of the flange (10) and the tapered surface (15), the tape (2) can be prevented from being buckled by a force applied thereto from a tape regulating end face of a flange. Thus, the tape guide roller does not damage the tape.

1 Claim, 3 Drawing Sheets

TAPE GUIDE ROLLER WITH FLANGE AND TAPERED SURFACE FOR USE IN VIDEO TAPE RECORDER

This is a continuation of application Ser. No. 08/247,510 filed May 23, 1994 now abandoned, which is a continuation of U.S. Ser. No. 08/029,921, filed Mar. 11, 1993, now abandoned, which in turn is a continuation of Ser. No. 07/802,307, filed Dec. 4, 1991, now abandoned.

BACKGROUND OF THE INVENTION

1. Field of the Invention

The present invention generally relates to tape guide rollers and, more particularly, is directed to a tape guide roller for use in a tape transport portion of a tape recording and reproducing apparatus.

2. Description of the Prior Art

FIG. 1 schematically illustrates an example of a tape transport system of a tape recording and reproducing apparatus, e.g., an 8-mm video tape recorder (8-mm VTR).

In FIG. 1, reference numeral 1 depicts a tape cassette and reference numeral 2 a tape (magnetic tape) accommodated within the tape cassette 1. As shown in FIG. 1, in use, the tape 2 is withdrawn from the tape cassette 1 and wrapped around a magnetic head drum 3, thereby transported in this state. Further, in FIG. 1, reference numeral 4 depicts a tension regulator, 5 a capstan and 6 a pinch roller. Tape guide rollers 7 are disposed at both sides of the magnetic head drum 3 and the height of the tape 2 relative to the magnetic head drum 3 is regulated by these tape guide rollers 7.

FIG. 2 shows an arrangement of this kind of conventional tape guide roller 7.

As shown in FIG. 2, the tape guide roller 7 is composed of a roller 9 pivotally supported to a roller shaft 8, and upper and lower flanges 10 and 11 attached to the roller shaft 8 in the upper and lower positions of the roller 9. The tape guide roller 7 is secured to a base portion (not shown) of a tape recording and reproducing apparatus by means of a screw portion 12.

In use, the tape 2 is transported while in rotatable contact with the roller 9, and the height thereof is regulated by the upper flange 10 or by the lower flange 11. More specifically, in the illustrative example of FIG. 2, a lower end surface of the upper flange 10 serves as a tape regulating end face 13 and the height of the tape 2 is regulated by holding a tape edge (edge portion) of the tape 2 by the tape regulating end face 13.

The tape guide roller 7 thus arranged regulates the height of the tape 2 only by the tape regulating end face 13 of the upper flange 10 so that, if a tape is thin or if a tape is weak in strength, then the tape 2 will be easily buckled at its tape edge by a tape regulating force applied thereto from the tape regulating end face 13 of the upper flange 10 as shown in FIG. 3. Accordingly, it is to be noted that this conventional tape guide roller 7 is not sufficiently designed so as to prevent the tape from being damaged, broken or crinkled. Furthermore, in order to keep the stability of the tape transport system without tape damage or the like, the tape path must be adjusted with high accuracy, which is very difficult in actual practice, and the assembly parts must be produced at high accuracy.

OBJECTS AND SUMMARY OF THE INVENTION

Accordingly, it is an object of the present invention to provide an improved tape guide roller in which the aforementioned shortcomings and disadvantages encountered with the prior art can be eliminated.

More specifically, it is an object of the present invention to provide a tape guide roller which can regulate the height of a tape without applying an excessive force to the tape.

Another object of the present invention is to provide a tape guide roller which can prevent a tape from being buckled.

Still another object of the present invention is to provide a tape guide roller which becomes resistant to tape damage.

A further object of the present invention is to provide a tape guide roller which can maintain the stability of a tape transport system of a tape recording and reproducing apparatus with ease.

Still a further object of the present invention is to provide a tape guide roller which can considerably reduce the number of processes in which the tape path is adjusted and checked.

Yet a further object of the present invention is to provide a tape guide roller by which assembly parts need not be produced with high accuracy.

An additional object of the present invention is to provide a tape guide roller for use in a tape recording and reproducing apparatus such as an 8-mm VTR or the like.

As an aspect of the present invention, a tape guide roller provided in a tape transport portion of a tape recording and reproducing apparatus comprises a roller pivotally supported to a roller shaft so as to come in rotatable contact with a tape, and a flange having a tapered surface opposing an inner surface of the tape, wherein the flange generates a tape height regulating force by both a tape regulating end face with which a tape edge of the tape is brought in slidable contact and the tapered surface along which the tape is slidably transported.

The preceding and other objects, features, and advantages of the present invention will become apparent in the following detailed description of illustrative embodiments thereof when read in conjunction with the accompanying drawings, wherein like reference numerals are used to identify the same or similar parts in the several views.

DETAILED DESCRIPTION OF THE PREFERRED EMBODIMENTS

Figure 1:
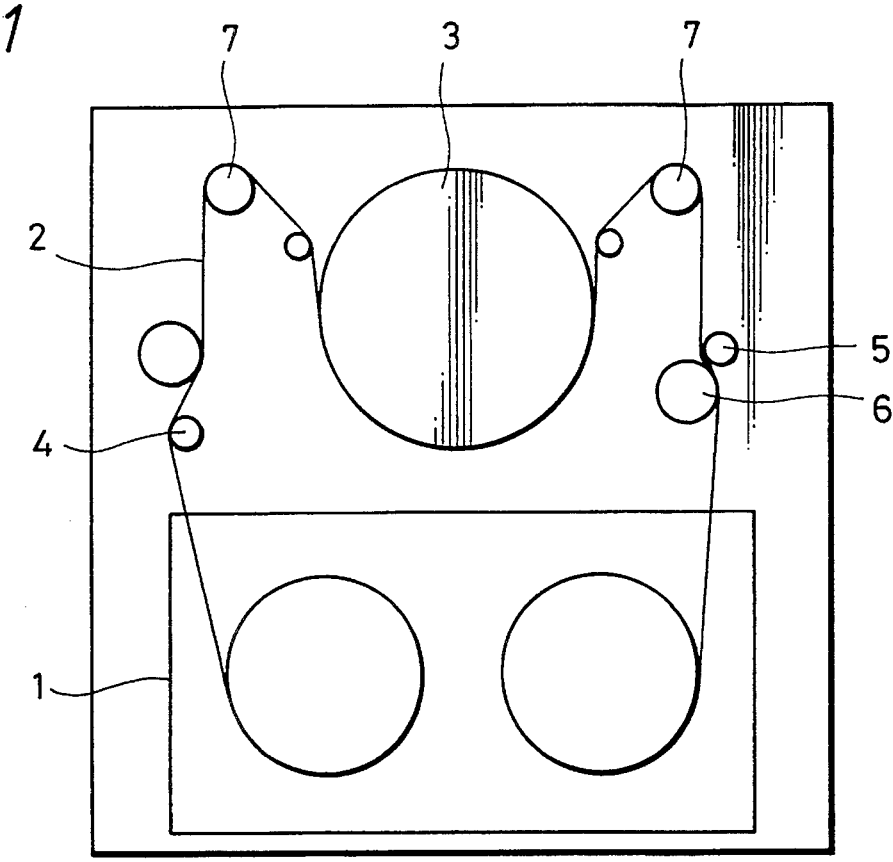
FIG. 1 is a schematic diagram used to explain a tape recording and reproducing apparatus having tape guide rollers.
Figure 2:
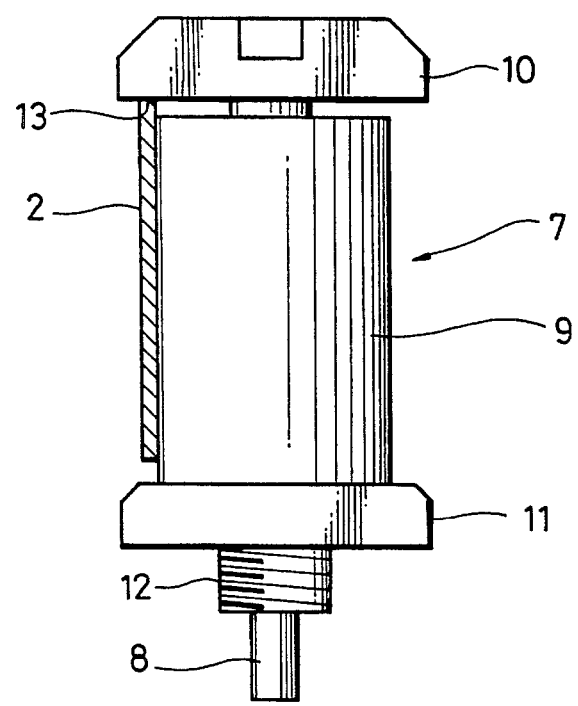
FIG. 2 is a side view of an example of a tape guide roller according to the prior art.
Figure 3:
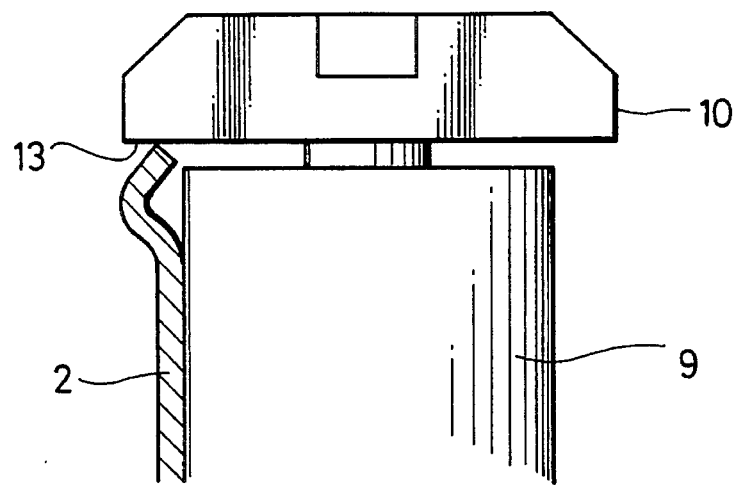
FIG. 3 is a fragmentary, enlarged side view of the example of the prior-art tape guide roller shown in FIG. 2, and to which references will be made in explaining how a tape is buckled.

Referring to the drawings in detail, and initially to FIGS. 4 and 5, a first embodiment of the present invention will be described, wherein like parts corresponding to those of the example of the prior art shown in FIGS. 2 and 3 are marked with the same references and therefore need not be described in detail.

Figure 4:
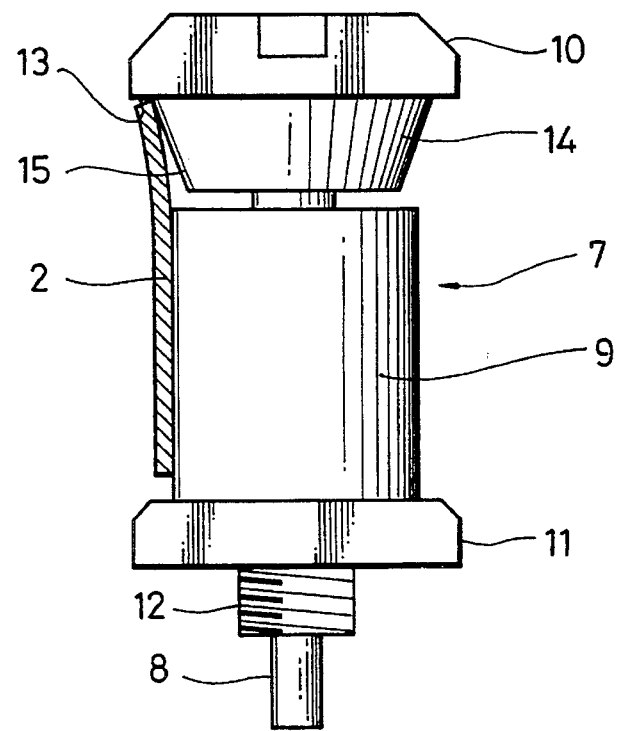
FIG. 4 is a side view of a tape guide roller according to a first embodiment of the present invention.
Figure 5:
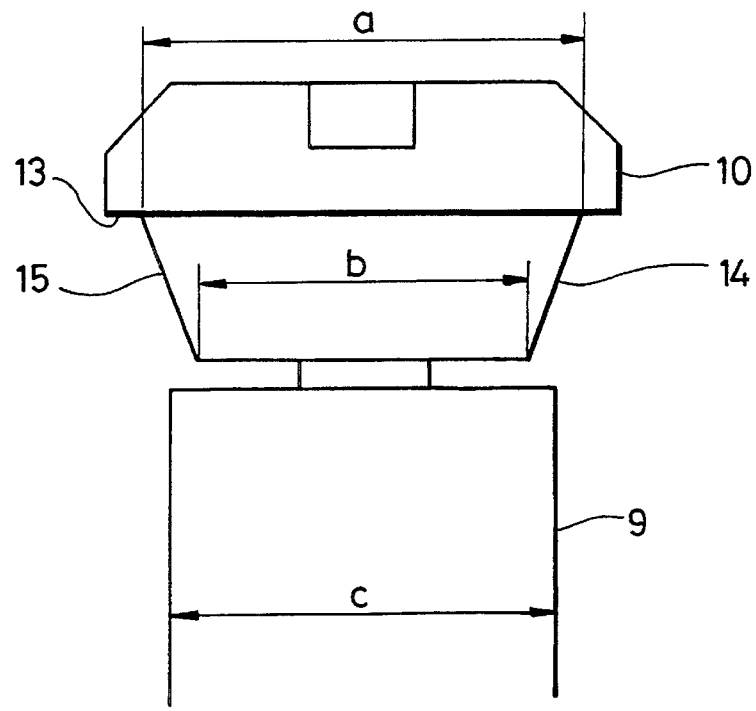
FIG. 5 is a schematic diagram used to explain a dimension relation among the parts of the first embodiment of the present invention.

In this embodiment, as shown in FIGS. 4 and 5, a downwardly-protruded tape transport portion 14 is unitarily formed with the lower surface of the upper flange 10 so as to permit the transport of the tape 2. A circumferential surface of the tape transport portion 14, i.e., the surface opposing the inner surface of the tape 2, is formed as a tapered surface 15, the outer diameter of which is decreased in the roller 9 side. A maximum diameter a of the tape transport portion 14 is larger than an outer diameter c of the roller 9 and a minimum diameter b thereof is smaller than the outer diameter c of the roller 9. The minimum diameter b of the tape transport portion 14 might be equal to the outer diameter c of the roller 9. Since the tape transport portion 14 having the tapered surface 15 is unitarily formed with the upper flange 10, the height (length) of the roller 9 can be reduced accordingly, as compared with the example of the prior art. The rest of elements and parts of this embodiment is the same as that of the example of the prior art.

In the thus arranged tape guide roller 7 of this embodiment, the tape 2 is transported while in rotatable contact with the circumferential surface of the roller 9, and the height of the tape 2 is regulated by the cooperation of the tape regulating end face 13 of the upper flange 10 and the tapered surface 15 of the tape transport portion 14. That is, the tape edge of the tape 2 slidably makes contact with the tape regulating end face 13 of the upper flange 10 and also slidably contacts with the tapered surface 15 of the tape transport portion 14 to generate a regulating force which downwardly pushes the tape 2 (force which regulates the upward movement of the tape 2), thereby the height of the tape 2 being regulated.

Since the portion which generates the height regulating force for the tape 2 is divided into the tape regulating end face 13 of the upper flange 10 and the tapered surface 15 of the tape transport portion 14, the tape 2 can be prevented from being buckled unlike the prior art. To be more concrete, while the height of the tape 2 is regulated only by the tape regulating end face 13 of the upper flange 10 according to the prior art, in this embodiment, the height regulating force for regulating the height of the tape 2 is generated by the cooperation of both the tape regulating end face 13 of the upper flange 10 and the tapered surface 15 of the tape transport portion 14, whereby the height of the tape 2 can be regulated without applying an excessive force to the tape 2. Accordingly, unlike the prior art, the tape 2 can be prevented from being buckled and the tape guide roller of this embodiment becomes resistant to the tape damage.

The inventor of the present invention has made the tape guide roller of this embodiment as an experiment and this sample tape guide roller was mounted on a mechanical deck of the 8-mm VTR for test. In the experiment, tape tensions at which the tape will be damaged were measured during the tape running. The measured results demonstrate that the tape tension in accordance with the invention safely becomes as large as 3 to 3.5 times the tape tension of the prior art. That is, the tape guide roller of this embodiment becomes as strong as 3 to 3.5 times the conventional tape guide roller to the tape damage. Since the tape guide roller of the present invention becomes resistant to the tape damage as described above, stability of the tape transport system can be maintained with ease, and the number of the processes for adjusting and checking the tape path can be reduced considerably. Also, the accuracy of the assembly parts need not be increased so much, as compared with the prior art.

Figure 6:
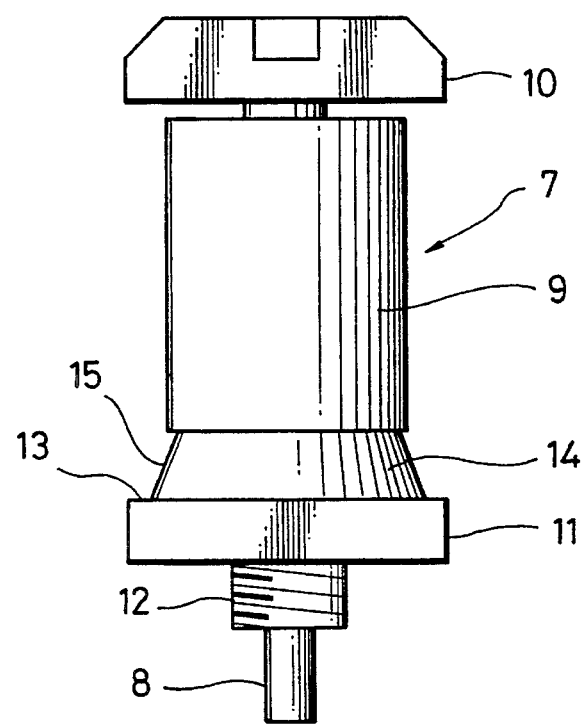
FIG. 6 is a side view of the tape guide roller according to a second embodiment of the present invention.

A second embodiment of the tape guide roller according to the present invention will be described below with reference to FIG. 6. Also in FIG. 6, like parts corresponding to those of FIGS. 4 and 5 are marked with the same references and therefore need not be described.

While the height of the tape 2 is regulated by the upper flange 10 of the upper and lower flanges 10 and 11 in the first embodiment shown in FIGS. 4 and 5, the present invention is not limited thereto and a variant is also possible wherein the height of the tape 2 is regulated on the lower flange 11 side. In this case, as shown in FIG. 6, an upper end face of the lower flange 11 serves as the tape regulating end face 13 and the lower flange 11 is unitarily formed with the tape transport portion 14 whose tapered surface 15 is reduced in diameter in the roller 9 side.

As from the foregoing description makes clear, since the tape guide roller of the present invention is constructed so as to generate the tape height regulating force by the cooperation of both the tape regulating end face of the flange and the tapered surface of the tape transport portion, the tape height can be regulated without applying an excessive force to the tape, thereby preventing the tape from being buckled at its edge, in contrast to the prior art. Thus, the tape guide roller of the invention becomes resistant to tape damage. Also, the stability of the tape transport system can be maintained with ease. As a result, the number of processes for adjusting and checking the tape path can be reduced considerably and the accuracy of the assembly parts need not be increased so much, as compared with the prior art.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A tape guide roller comprising:

a roller shaft affixed at a first end to a tape guide portion adjacent a magnetic head drum of a video tape recorder;

a rotatable cylindrical roller having a uniform right cylindrical surface supported for rotation on said roller shaft so as to come in continuous rotatable contact with a tape wrapped around the magnetic head drum, said rotatable cylindrical roller having a height substantially less than the width of said tape;

a circular flange attached to a second end of said shaft and having an outer diameter greater than an outer diameter of said rotatable cylindrical roller and having a lower surface opposing an upper edge of said tape;

a non-rotatable tape transport portion unitarily formed on the lower surface of said circular flange, said tape transport portion having a conical shape tapering toward an upper end of said cylindrical roller; and a gap formed between said tape transport portion and the upper end of said cylindrical roller, wherein said conical shape of said tape transport portion has a maximum diameter larger than the outer diameter of said cylindrical roller and smaller than the outer diameter of said circular flange and said conical shape has a minimum diameter smaller than the outer diameter of said cylindrical roller, and wherein the height of said tape transport portion plus said height of said cylindrical roller less a width of said gap is substantially equal to the width of the tape, said cylindrical roller being rotatable and said transport portion being non-rotatable such that the tape is in continuous rotatable contact with said cylindrical roller and is in continuous slidable contact with said tape transport portion, and a tape height regulating force acting on said tape is generated by both said lower surface of said flange and said conical shape of said tape transport portion, the force on said tape generated by said flange and the force on said tape generated by said tape transport portion acting substantially in the same direction.

* * * * *